United States Patent
Alizadeh et al.

(10) Patent No.: US 11,659,445 B2
(45) Date of Patent: May 23, 2023

(54) DEVICE COORDINATION FOR DISTRIBUTED EDGE COMPUTATIONS

(71) Applicant: Cisco Technology, Inc., San Jose, CA (US)

(72) Inventors: Ardalan Alizadeh, Milpitas, CA (US); Gautam D. Bhanage, Milpitas, CA (US); Sivadeep R. Kalavakuru, Akron, OH (US); Pooya Monajemi, San Jose, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/443,596

(22) Filed: Jul. 27, 2021

(65) Prior Publication Data
US 2023/0034758 A1 Feb. 2, 2023

(51) Int. Cl.
*H04W 28/08* (2023.01)
*H04W 28/16* (2009.01)

(52) U.S. Cl.
CPC ... *H04W 28/0975* (2020.05); *H04W 28/0804* (2020.05); *H04W 28/0835* (2020.05); *H04W 28/0908* (2020.05); *H04W 28/16* (2013.01)

(58) Field of Classification Search
CPC ......... H04W 28/0975; H04W 28/0835; H04W 28/0804; H04W 28/0908; H04W 28/16; H04L 43/16; H04L 43/08; H04L 67/10
See application file for complete search history.

(56) References Cited

U.S. PATENT DOCUMENTS

| | | |
|---|---|---|
| 2016/0360543 A1 | 12/2016 | Elsherif et al. |
| 2019/0132762 A1 | 5/2019 | Zhu et al. |
| 2020/0045555 A1 | 2/2020 | Huang et al. |
| 2020/0304173 A1 | 9/2020 | Chu et al. |
| 2021/0083959 A1* | 3/2021 | Yang ...................... H04L 43/16 |
| 2021/0105639 A1 | 4/2021 | McFarland |
| 2021/0120454 A1 | 4/2021 | Chennichetty et al. |
| 2021/0240673 A1* | 8/2021 | Novotny ............... H04L 67/104 |

OTHER PUBLICATIONS

Park et al., "Considerations on Coordinated OFDMA," Jan. 2020, doc.: IEEE 802.11-20/0011r0, 15 pages.
Chitraker et al., "Preparations for Coordinated OFDMA," Jan. 2020, doc.: IEEE 802.11-20/0056r2, 8 pages.
Jaeyoung Song, Marios Kountouris, "Wireless Distributed Edge Learning: How Many Edge Devices Do We Need?," IEEE Journal on Selected Areas in Communications (JSAC), Submitted on Nov. 22, 2020.

* cited by examiner

*Primary Examiner* — Anez C Ebrahim
(74) *Attorney, Agent, or Firm* — Patterson + Sheridan, LLP

(57) ABSTRACT

Techniques for distributed computation are provided. A plurality of edge computing devices available to execute a computing task for a client device is identified, and a first latency of transmitting data among the plurality of edge computing devices is determined. A second latency of transmitting data from the client device to the plurality of edge computing devices is determined, and a set of edge computing devices, from the plurality of edge computing devices, is determined to execute the computing task based at least in part on the first and second latencies. Execution of the computing task is facilitated using the set of edge computing devices, where the client device transmits a portion of the computing task directly to each edge computing device of the set of edge computing devices.

20 Claims, 8 Drawing Sheets

DEVICE COORDINATION FOR DISTRIBUTED EDGE COMPUTATIONS

TECHNICAL FIELD

Embodiments presented in this disclosure generally relate to edge computing. More specifically, embodiments disclosed herein relate to coordinated and distributed edge computing.

BACKGROUND

The growth of connected devices has led to a fundamental change in how users and enterprises engage in the digital world. Hierarchical client-server approaches have led to expansion of central cloud resources, resulting in network connectivity acting as a significant bottleneck for future growth. Further, sending data from (potentially billions of) client devices to centralized cloud servers can waste bandwidth and energy.

In some systems, edge devices can increasingly act as servers to perform many of the functions of the central cloud servers. This creates a hybrid edge cloud that can be significantly more powerful and efficient than the centralized cloud. Distributed edge compute is a new paradigm where the goal is to collaboratively perform computing tasks by exploiting distributed parallel computing.

However, passing messages and data among edge devices still adds delays in distributed computing platforms. In some systems, segmented messages are first transferred to a controller before being distributed to edge devices, increasing communication costs and latency.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
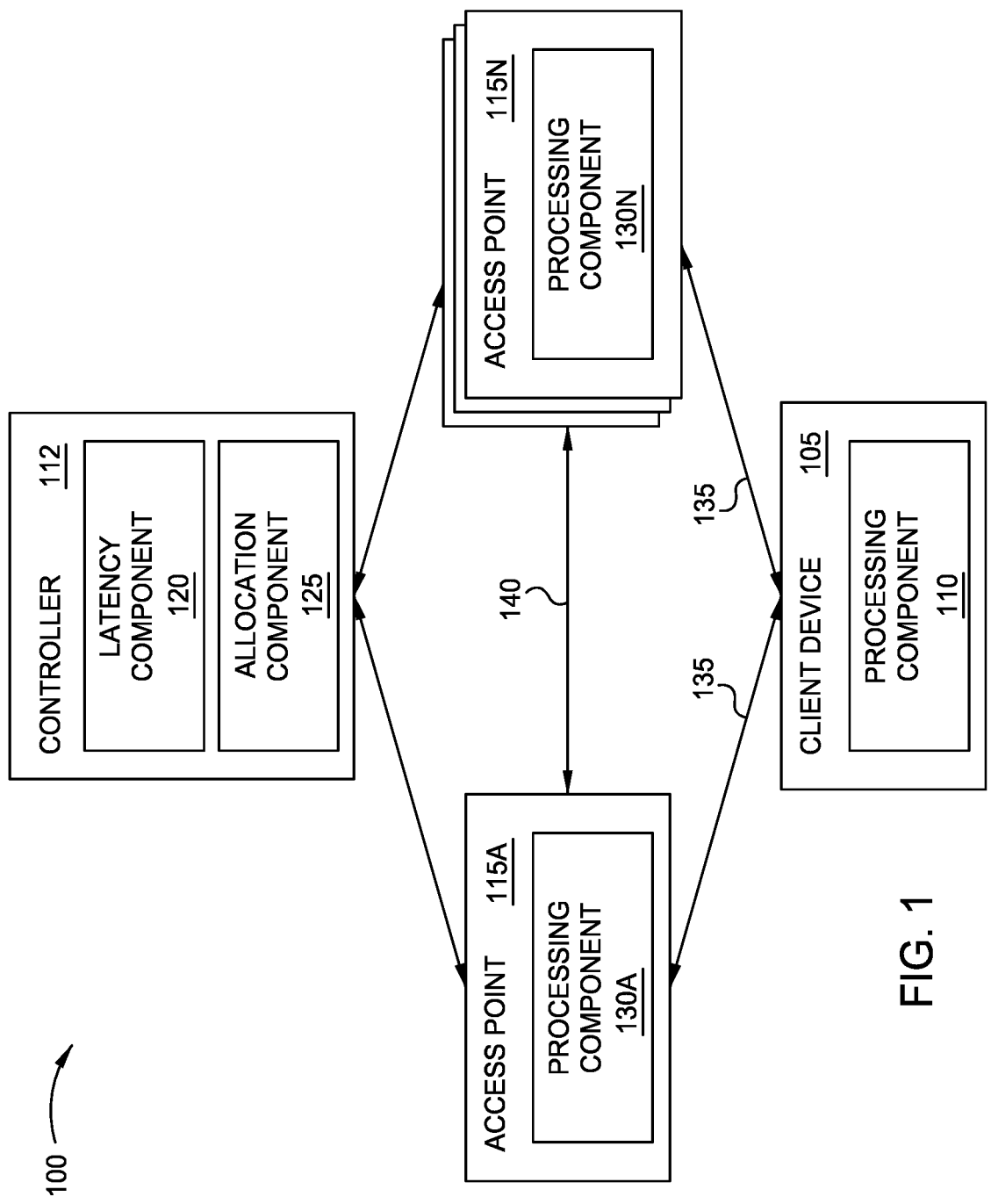
FIG. 1 depicts an example system to provide coordinated distributed edge computation, according to some embodiments disclosed herein.

According to one embodiment presented in this disclosure, a method is provided. The method includes identifying a plurality of edge computing devices available to execute a computing task for a client device; determining a first latency of transmitting data among the plurality of edge computing devices; determining a second latency of transmitting data from the client device to the plurality of edge computing devices; determining a set of edge computing devices, from the plurality of edge computing devices, to execute the computing task based at least in part on the first and second latencies; and facilitating execution of the computing task using the set of edge computing devices, wherein the client device transmits a portion of the computing task directly to each edge computing device of the set of edge computing devices.

According to a second embodiment of the present disclosure, a computer product is provided. The computer product comprises logic encoded in a non-transitory medium, the logic executable by operation of one or more computer processors to perform an operation comprising: identifying a plurality of edge computing devices available to execute a computing task for a client device; determining a first latency of transmitting data among the plurality of edge computing devices; determining a second latency of transmitting data from the client device to the plurality of edge computing devices; determining a set of edge computing devices, from the plurality of edge computing devices, to execute the computing task based at least in part on the first and second latencies; and facilitating execution of the computing task using the set of edge computing devices, wherein the client device transmits a portion of the computing task directly to each edge computing device of the set of edge computing devices.

According to a third embodiment of the present disclosure, a system is provided. The system comprises one or more computer processors; and logic encoded in a non-transitory medium, the logic executable by operation of the one or more computer processors to perform an operation comprising: identifying a plurality of edge computing devices available to execute a computing task for a client device; determining a first latency of transmitting data among the plurality of edge computing devices; determining a second latency of transmitting data from the client device to the plurality of edge computing devices; determining a set of edge computing devices, from the plurality of edge computing devices, to execute the computing task based at least in part on the first and second latencies; and facilitating execution of the computing task using the set of edge computing devices, wherein the client device transmits a portion of the computing task directly to each edge computing device of the set of edge computing devices.

EXAMPLE EMBODIMENTS

Embodiments of the present disclosure provide techniques to coordinate distributed edge computing to improve computational efficiency and reduce transmission overhead.

With the development of improved wireless communication technology, offloading computation tasks from wireless client devices (also referred to as stations in some embodiments) to nearby access points (APs) or base stations is possible. Such edge computation can avoid backhauling traffic generated by applications to a remote data center, and provides an efficient approach to bridge the user device and edge server. Moreover, edge computation can reduce the delay in executing the computation tasks and save energy consumption for other delay-sensitive cloud-computing applications.

In some embodiments, distributed edge computing can be used to allow computational tasks to be distributed across multiple edge devices (e.g., multiple APs) for faster execution. Generally, distributed edge computing can be used to execute any computational task. In some aspects of the present disclosure, distributed machine learning is one such task. However, the embodiments disclosed herein are readily applicable to any distributed computation.

In one example of distributed edge learning, a parameter server (which has access to the entire training dataset), can partition the training examples into disjoint subsets, which are in turn distributed to multiple devices for processing. As each such device accesses and operates only on part of the entire dataset, the outcome(s) of its computations (e.g., intermediate results) can be aggregated at the server to yield a global model.

In some embodiments, the distributed learning can be accomplished by distributing the data partitions to a set of APs, each of which performs some operation or computation on its partition. In existing systems, the client device typically transmits the entire workload or task to a single AP (e.g., to the AP that the client device is connected to or associated with). The AP (sometimes referred to as the leader AP) can then distribute the task among participating APs (sometimes referred to as follower APs). In some systems, the distribution is performed or controlled via a controller. That is, the task can be transmitted from the leader AP to the controller, which distributes the subtasks. In other systems, the controller instructs the leader AP how to divide and distribute the task.

In one embodiment of the present disclosure, coordinated transmission techniques are used to distribute the subtasks directly from the client device to the participating APs. For example, coordinated orthogonal frequency-division multiple access (C-OFDMA), multiple-user multiple input multiple output (MU-MIMO) techniques, mesh networks, and the like can be used to allow the client device to directly transmit data to the APs, without needing to pass the entire dataset through a single leader AP or a controller.

FIG. 1 depicts an example system 100 to provide coordinated distributed edge computation, according to some embodiments disclosed herein.

In the system 100, a client device 105 is communicatively coupled with one or more access points 115A-N (collectively 115) via a connection 135. In some embodiments, the connection 135 is wireless. For example, the AP(s) 115 may provide wireless connectivity (e.g., a WiFi network), and the client device 105 may associate (e.g., connect) to an AP 115 to access this network. As further illustrated, the APs 115 may be directly linked via connection 140, which can include a wired backhaul as well as wireless connectivity (e.g., in a mesh network). As illustrated, the system 100 further includes a controller 112, which can generally control the operations and configurations of the APs 115.

The client device 105 includes a processing component 110 that performs computational tasks. For example, the processing component 110 may train machine learning models based on training data. However, in some embodiments, it can be advantageous for the client device 105 to offload all or a portion of its computational tasks in order to reduce latency, preserve limited computational resources of the client device 105, reduce power consumption, and the like.

In one embodiment, therefore, the client device 105 can interact with one or more APs 115 to distribute computational tasks for execution. As illustrated, each AP 115 can include a corresponding processing component 130 to execute computing tasks on behalf of requesting client devices 105. For example, the processing components 130 may train machine learning models based on training data.

In the illustrated example, the controller 112 includes a latency component 120 and an allocation component 125. Though depicted as discrete components for conceptual clarity, in embodiments, the operations of the latency component 120 and allocation component 125 may be combined or distributed across any number of components, and may be implemented using hardware, software, or a combination of hardware and software. Further, although depicted as included within the controller 112, in some embodiments, the operations of the latency component 120 and allocation component 125 may be performed on one or more other devices. For example, in one embodiment, one or more of the APs 115 may implement the latency component 120 and/or allocation component 125.

In one embodiment, the latency component 120 can determine and evaluate various latencies in the system 100, including transmission latencies (e.g., between the client device 105 and the APs 115 via connections 135, among the APs 115 via backhaul connection 140, or between the APs 115 and one or more remote servers), processing latencies at one or more devices, and the like. These latencies can be used to determine an optimal distribution of computational tasks, as discussed in more detail below.

In an embodiment, the allocation component 125 generally selects a set of participating edge devices (e.g., APs 115) and allocates the computational task accordingly (based at least in part on the determined or estimated latencies), as discussed in more detail below. In at least one embodiment, the allocation component 125 can further allocate resource units (RUs) as part of a C-OFDMA process.

In traditional systems that utilize distributed computation, when a device (e.g., client device 105) offloads all or some of its tasks to edge devices (e.g., APs 115), all of the relevant information must be sent via the AP to which the device is associated or connected. For example, if the client device 105 (or a user thereof) wished to offload a training task, it would transmit the entire task (e.g., the training set) to the AP 115A that is currently serving the device via connection 135. Subsequently, the task can be distributed to multiple edge nodes (e.g., AP 115N) via the backhaul connection 140 based on a task management plan. However, the latency of this data distribution procedure plays a significant role in the realization and efficiency of such distributed computation. In aspects of the present disclosure, therefore, the client device 105 may be communicatively coupled directly to each participating edge device. The task can thereby be divided and distributed directly to the APs 115 via the connections 135, rather than first via the leader AP 115A and then via the connection 140 between the APs 115.

In some embodiments, the system 100 uses techniques such as C-OFDMA to enable this direct connectivity to multiple APs 115. C-OFDMA uses the frequency domain of wireless signals to enable coordinated service of multiple clients (which are associated to coordinated APs). Generally, C-OFDMA involves dividing a wireless channel into multiple subcarriers, and transmitting each subcarrier at right angles to each other in order to prevent interference. In some embodiments of the present disclosure, each AP 115 is assigned one or more subcarriers for communications with the client device 105. By coordinating these APs 115 via C-OFDMA, the system 100 can allow them to share the channel without interference, enabling a single client device 105 to connect to multiple APs 115 in concurrently.

Generally, as C-OFDMA (and other techniques) involve dividing the channel, the bandwidth (and throughput) of each connection may thereby be reduced. That is, the data rate between the client device 105 and a single AP 115 may be greater than the data rate between each individual AP 115 and the client device 105 when the device connects to multiple APs 115. However, the aggregate throughput (across all connections to all APs 115) may be comparable. Further, by directly distributing the computing tasks, the system 100 can bypass the backhaul connection 140, which may reduce the overall latency of the operation.

In embodiments of the present disclosure, C-OFDMA techniques or other techniques or systems (such as MU-MIMO or mesh networks) can similarly be used to enable multiple wireless links to be formed directly between the client device 105 and a set of APs 115 concurrently. This can significantly improve the latency of distributing the task data.

In some embodiments, the AP 115 to which the client device 105 is associated (e.g., AP 115A in the illustrated example) can act as the leader device in the coordinated computation. For example, the AP 115A may coordinate the participating APs 115 (e.g. performing C-OFDMA tasks such as RU allocation among the APs 115) in order to execute the task. In some embodiments, another device (such as the controller 112) may provide coordination.

In one embodiment, the system 100 may endeavor to solve an objective function to select an optimal number of participating APs, and to distribute the task to APs 115 in order to minimize the total latency $T_{total}=T_{wired}+T_{wireless}+T_{process\_local}$, where $T_{total}$ is the total latency, $T_{wired}$ is the latency of data transmission among the APs 115 (e.g., via backhaul connection 140), $T_{wireless}$ is the latency of data transmission between the client device 105 and one or more APs 115 (e.g., via connections 135), and $T_{process\_local}$ is the processing time to execute the task (or a portion thereof) at each device.

In some embodiments, $T_{wireless}$ can be defined as $N*T_{direct}$, where N is the number of APs 115 selected and $T_{direct}$ is the latency between the client device 105 and a single AP 115. Further, $T_{process\_local}$ may be defined as $$\frac{M*c}{N},$$

where M is the number of tasks (or task complexity) and c indicates the computational capacity of each edge.

In some embodiments, $T_{wired}$ is defined based on the communication requirements of the underlying task. For example, for simple tasks where the APs 115 execute respective sub-tasks and return the results to the client device 105, $T_{wired}$ may be zero. In other tasks (such as distributed learning tasks that may require transmission of updates to a cloud server), $T_{wired}$ may include the communication latency between the APs 115 and a cloud server that manages the learning.

Generally, embodiments of the present disclosure can reduce the time or latency of the data distribution phase (which can be significantly larger than computation phases, in some embodiments). In one embodiment, the scheduling of the distributed computation begins with a determination of the optimal number of coordinated APs 115 to participate.

In some embodiments, to determine the number of APs 115 that should participate, the leader AP 115A (or controller 112) can consider a variety of factors, including the speed of the computational process at each device, as well as the latency of data transfer via various paths.

Generally, increasing the number of participating APs 115 results in reduced processing time at each device (e.g., because the task is divided into smaller subtasks). However, increasing the number of APs 115 can also increase the data transmission time (e.g., because the connections between the client device 105 and each AP 115 are allocated only a portion of the channel). In some embodiments, the latency reduction achieved by including additional APs 115 can therefore be diminished or eliminated depending on the latency of traditional distribution via the connection 140, the latency of the individual connections 135 directly to each AP 115, and/or the latency of the computational task at each node.

In some embodiments, therefore, the latency component 120 can determine and consider these factors to determine the number of participating APs 115, with a constraint to ensure that the number of APs 115 is less than or equal to the number of available or potential participants (as well as less than or equal to any maximum number of connections available to the client device 105 via C-OFDMA or other techniques).

In an embodiment, once the optimal number of APs 115 has been determined, the allocation component 125 can select which APs 115 will participate, as well as the particular RU allocation among them. In some embodiments, the allocation component 125 does so by collecting and evaluating data such as the number of assigned tasks per AP 115, the available and/or preferred channels (or subcarriers) of each AP, the channel quality indicators for each channel and each AP 115 to communicate with the client device 105, and the like.

In some embodiments, the master AP 115A can thereby select a set of participants (e.g., based at least in part on their relative workloads and/or preferred channels), allocate RUs (e.g., subcarriers) among the selected set, and transmit a C-OFDMA trigger frame to each to initiate the connectivity and data distribution, as discussed below in more detail.

Figure 2A:
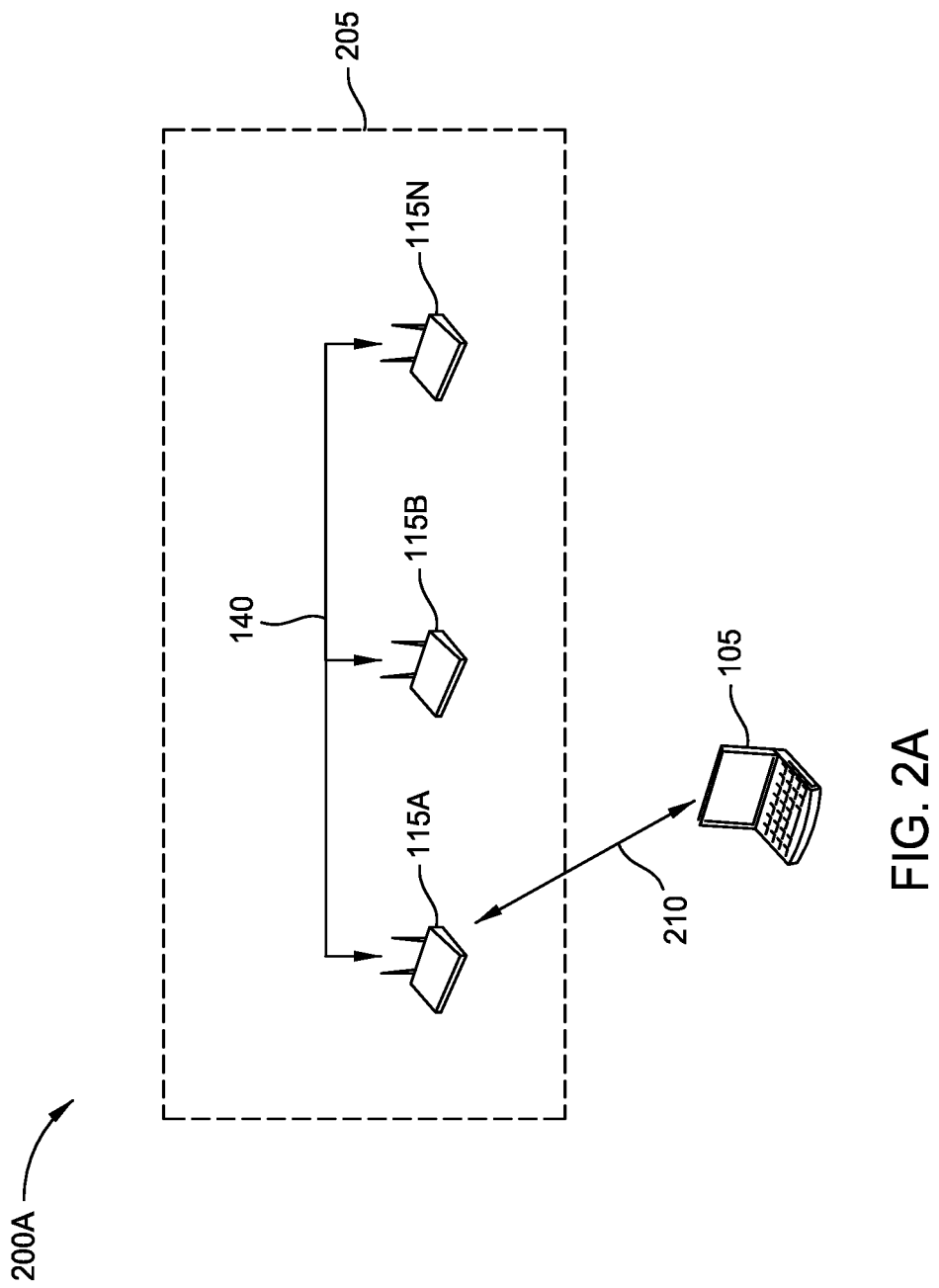
FIGS. 2A, 2B, and 2C depict an example workflow to establish coordinated distributed edge computation, according to some embodiments disclosed herein.
Figure 2B:
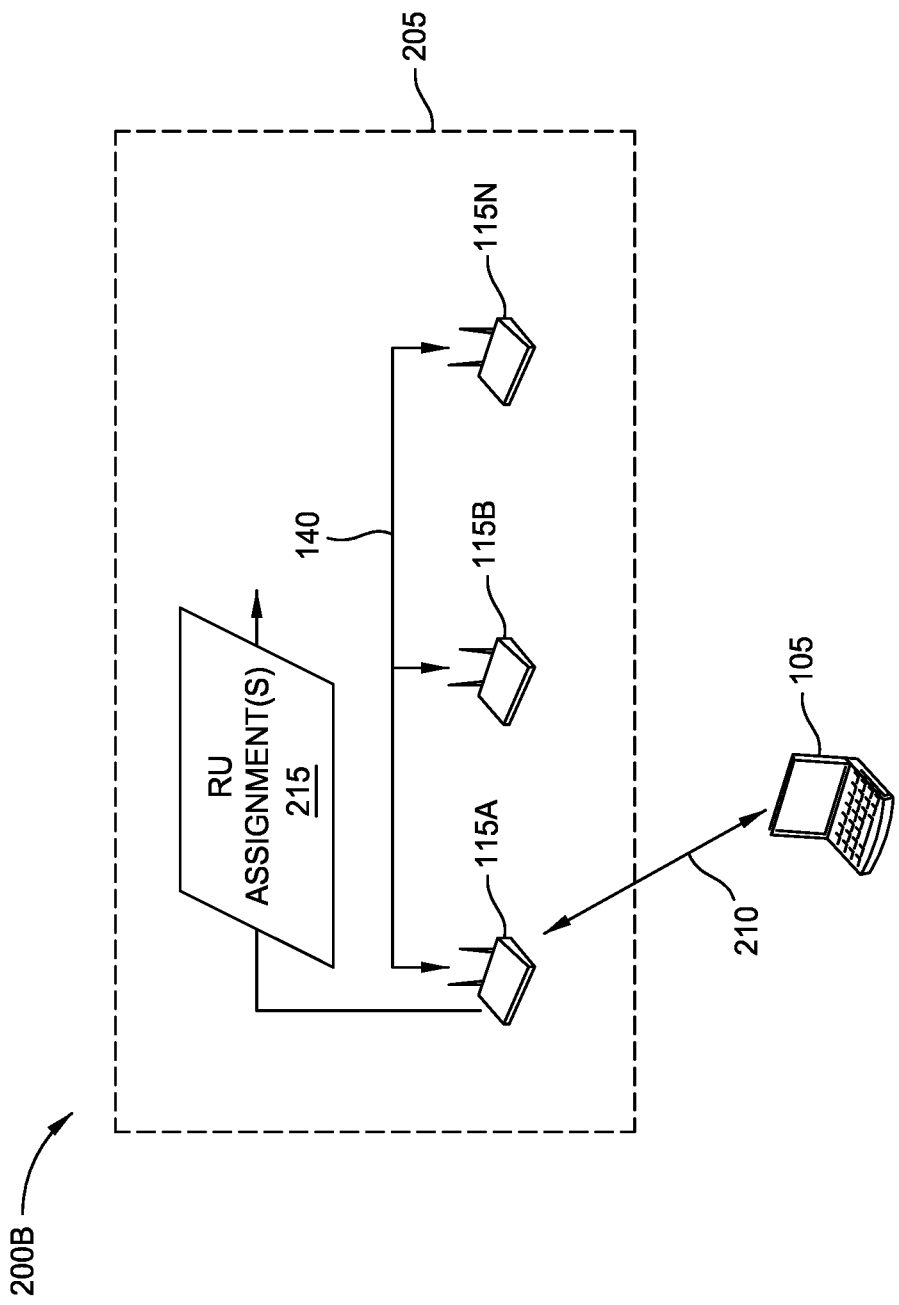
Figure 2C:
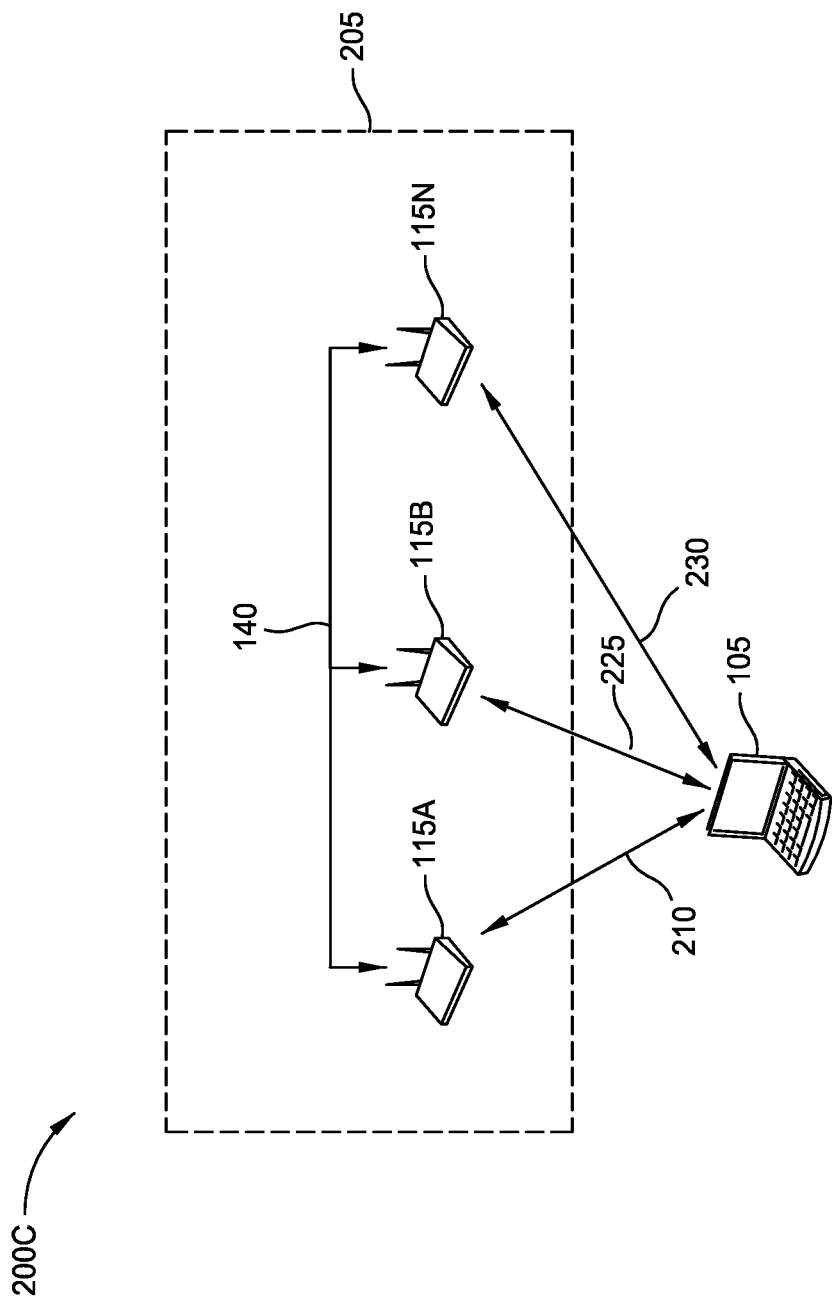

FIGS. 2A, 2B, and 2C depict an example workflow to establish coordinated distributed edge computation, according to some embodiments disclosed herein.

As illustrated in FIG. 2A, an environment 200A includes a client device 105 and a set of APs 115A-N. The APs 115A-N are connected by one or more backhaul connections 140. In the illustrated example, the APs 115A-N can operate as a coordinated cluster 205 of edge computing devices. That is, the APs 115A-N may execute computational tasks on behalf of client devices (such as client device 105) in a coordinated manner, as discussed above.

In the environment 200A, the client device 105 is initially connected to a single AP 115A, as illustrated by connection 210. In some embodiments, the client device 105 may be wirelessly connected with or associated to the AP 115A to enable connectivity to a broader network. For example, the AP 115A may provide wireless network connectivity, allowing the client device 105 (and other connected devices) to communicate with other devices (e.g., via the Internet).

In traditional systems for edge computation, the backhaul connection 140 is used to distribute computing tasks among the participating APs 115. That is, the client device 105 transmits the entirety of the task via the connection 210. The leader AP 115A can then divide it and distribute the subtasks to the other APs 115 via the backhaul connection 140. In some aspects, when the computational subtasks are complete, any relevant results are similarly transmitted, via the backhaul 140, to the leader AP 115A, which forwards them to the client device 105.

In embodiments of the present disclosure, however, various techniques (such as C-OFDMA) can be used to enable simultaneous connectivity to each participating AP 115, allowing the subtasks to be directly transmitted from the client device 105 to each participating AP 115 (e.g., without passing through the leader AP 115A to which the client device 105 is initially connected).

As depicted in FIG. 2B, after the client device 105 initiates or requests distributed computation capacity, the leader AP 115A can prepare and transmit one or more trigger frames to initiate the coordinated connectivity directly between each AP 115 and the client device 105.

In the illustrated example, the trigger frame(s) include the selected RU assignments 215. In some embodiments, the leader AP 115A (e.g., the AP 115 to which the client device 105 is already connected) determines the RU allocation. Although not included in the illustrated example, in some embodiments, the RU assignment/allocation is determined by one or more other devices (such as a controller 112). As discussed above, the RU assignments 215 generally include an indication of the particular RU(s) (e.g., subcarriers) assigned to each particular AP 115. In some embodiments, the RU allocation can be based on, for example, the preferred or available channels of each AP 115. One example technique used to select the participating APs and allocate RUs among them is discussed in more detail below with reference to FIG. 3.

As illustrated in FIG. 2C, each participating AP 115 can thereafter establish a direct connection to the client device 105 (indicated by connections 225 and 230) using the allocated RU(s). For example, using C-OFDMA, the client device 105 can connect to the three APs 115A, 115B, and 115N simultaneously, using a different set of RU(s) for each connection 210, 225, and 230. Notably, although the client device 105 can thereby communicate with each AP 115 effectively in parallel, the available throughput may be unchanged. That is, because the connections 210, 225, and 230 each use a relatively smaller slice of bandwidth (e.g., a subset of the total RUs that may be available for a one-to-one connection), the throughput of each individual connection may be similarly reduced.

For example, if the client device 105 can transmit m units of data per second via a single connection, the coordinated communication techniques described herein may reduce the throughput of each connection (e.g., to $$\frac{m}{N},$$

where N is the number of APs 115 participating in the coordinated transmissions). Though the throughput to each individual AP 115 is reduced, the overall throughput (aggregated across all N APs 115) can be comparable to a single connection to a single AP. However, because the subtasks are directly distributed to the APs 115 from the client device 105, the latency introduced by the backhaul 140 (e.g., to transmit subtasks from the leader AP to the participating APs) is eliminated. Thus, using embodiments described herein, the overall latency of executing the distributed task can be reduced.

Figure 3:
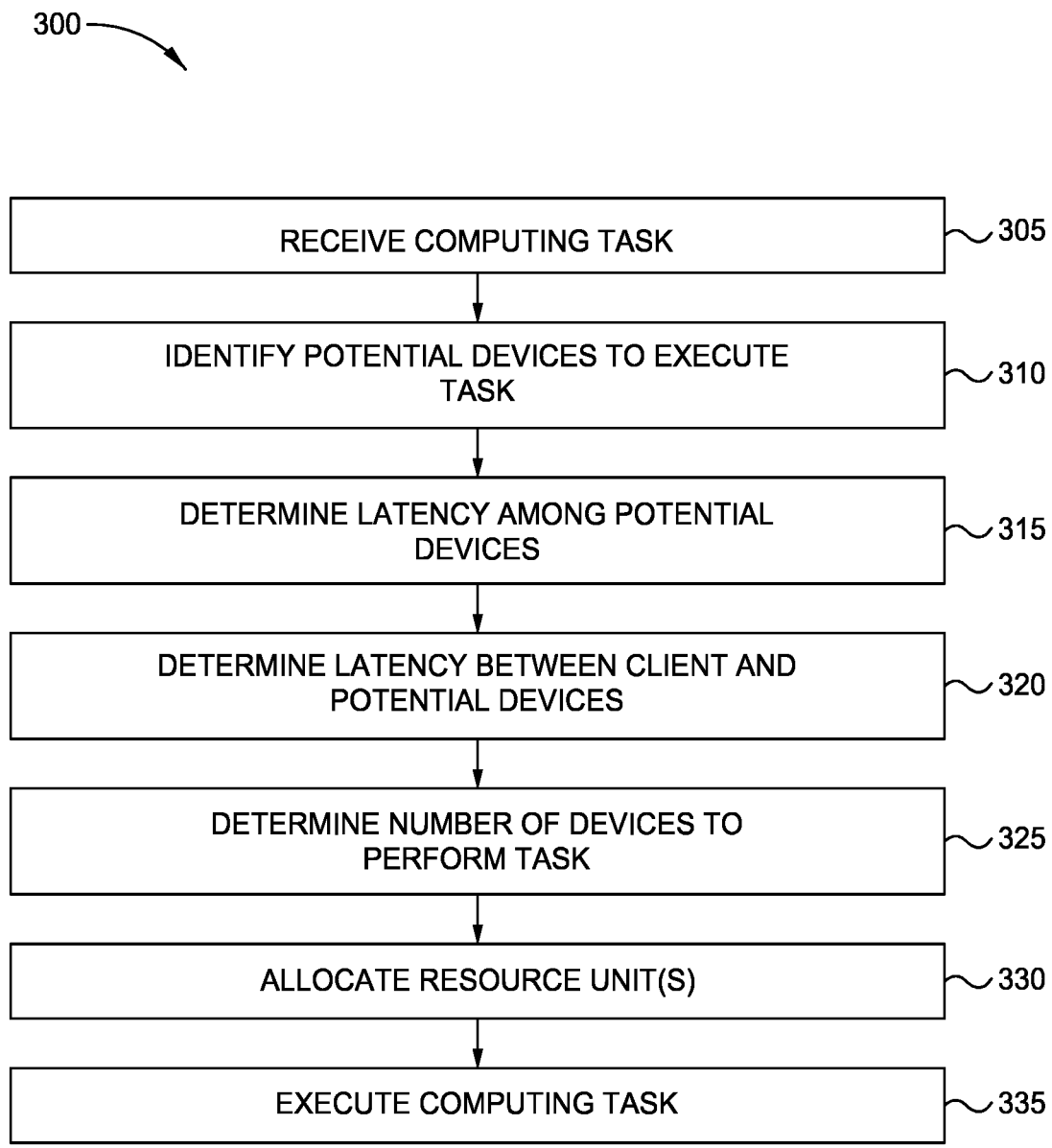
FIG. 3 is a flow diagram depicting a method for providing coordinated distributed edge computation, according to some embodiments disclosed herein.

FIG. 3 is a flow diagram depicting a method 300 for providing coordinated distributed edge computation, according to some embodiments disclosed herein.

The method 300 begins at block 305, where an edge computing device (e.g., AP 115A in FIG. 1) receives some indication of a computing task from a client device (e.g., client device 105 in FIG. 1). In some embodiments, the client device can transmit an indication to the AP to which it is associated, where the indication specifies one or more characteristics or aspects of the requested task. For example, the request may indicate the type of operation(s) required, the amount of data to be processed and/or size of the task, any latency requirements, and the like.

At block 310, the leader device (e.g., the AP 115A and/or controller 112, depicted in FIG. 1) can identify a set of potential participating devices (e.g., other APs) to execute the requested task. In some embodiments, identifying the set of potential participants includes identifying a set of edge computing devices that are reachable (e.g., via a wired backhaul connection and/or visible to the client device) and/or available (e.g., online and not currently occupied by other tasks) for the computing task.

The method 300 then continues to block 315, where the leader device determines the latency among the potential participating devices. For example, referring to the example depiction in FIG. 1, the leader device (e.g., the AP 115A or controller 112) may determine the latency of data transmission along the backhaul connection 140. As discussed above, the magnitude of this latency may influence whether the described distributed techniques are useful, as well as the number of participating devices that should be selected.

In some embodiments, determining the latency among the potential devices involves determining a single latency for all of the devices (e.g., presuming that the latency between the leader and a second device is the same or similar as the latency between the leader and the other devices). In one embodiment, the system may consider device-specific latencies for communications between the leader device and each individual potential participant.

At block 320, the leader device determines the latency between the requesting client device and one or more of the potential participating devices. For example, referring to the example depiction in FIG. 1, the leader device (e.g., the AP 115A or controller 112) may determine the latency of data transmission along the connection(s) 135. As discussed above, the magnitude of this latency may influence whether the described distributed techniques are useful, as well as the number of participating devices that should be selected.

In some embodiments, determining the latency between the client device and the potential devices involves determining a single latency for all of the devices (e.g., presuming that the latency between the client and a given participating device is the same or similar as the latency between the client and all other participating devices). In one embodiment, the system may consider device-specific latencies for communications between the client device and each individual potential participant.

The method 300 then proceeds to block 325, where the leader device determines the number of devices that should be selected to perform the requested computing task. In some embodiments, this determination is performed based at least in part on the latency among the participants, as well as the latency between the participants and the client device. In some embodiments, this determination is based further on the latency of actually executing the task (or subtask) at each participating device. Generally, the leader device may attempt to select a number of participants that minimizes the overall latency of the computing task.

At block 330, the leader device allocates RUs, as discussed above. For example, the leader device may allocate RUs based on the number of tasks each participating device is executing, the available or preferred channels of each, and the like. One example of this determination is discussed in more detail below with reference to FIG. 4. In some embodiments, allocating the RUs also includes transmitting one or more trigger frames to each participating edge device.

At block 335, the leader device facilitates execution of the computing task in a coordinated and distributed manner. For example, if the leader device is, itself, a participant, the leader device can receive and begin executing its subtask. Advantageously, using embodiments disclosed herein, the overall latency of the distributed task can be reduced by using coordinated parallel communications.

Figure 4:
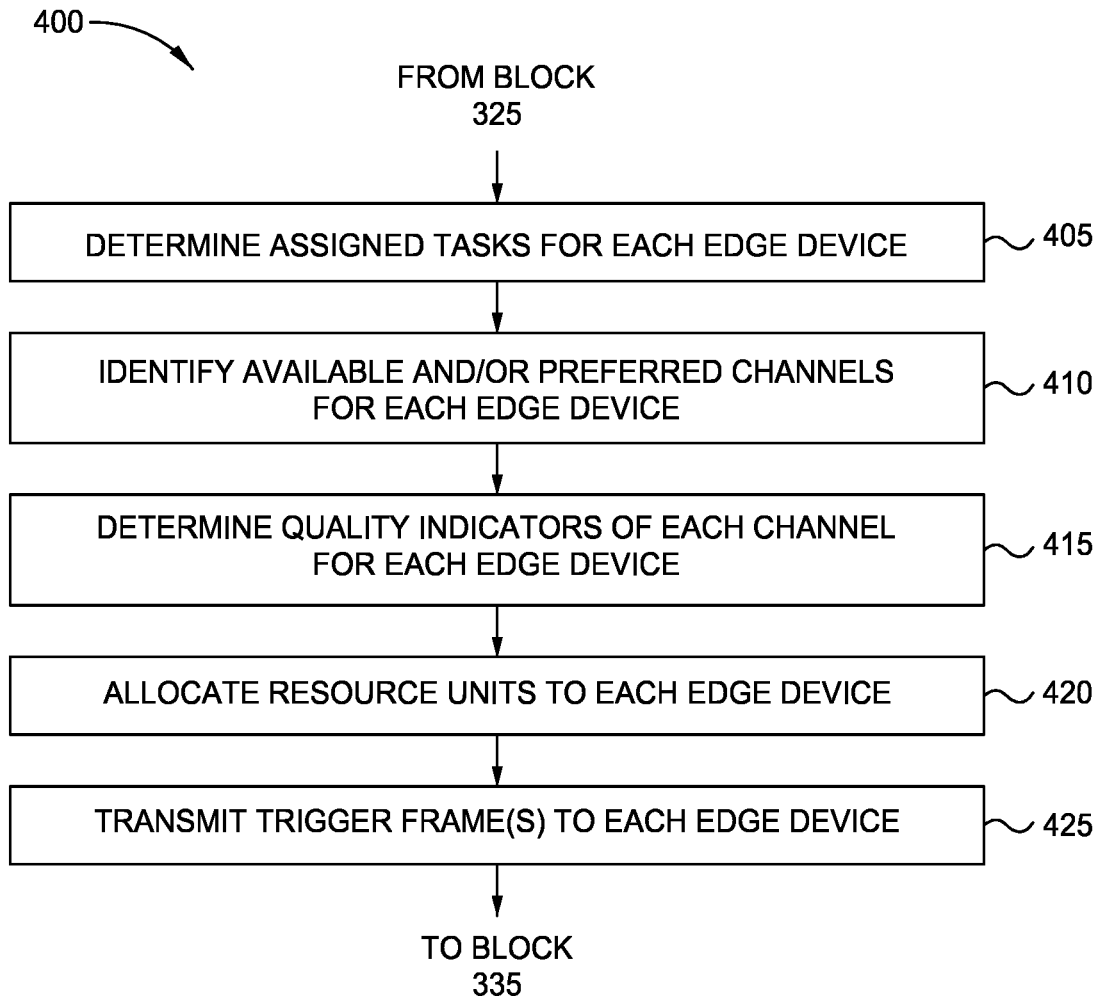
FIG. 4 is a flow diagram depicting a method for allocating resource units for coordinate distributed edge computation, according to some embodiments disclosed herein.

FIG. 4 is a flow diagram depicting a method 400 for allocating resource units for coordinate distributed edge computation, according to some embodiments disclosed herein. In some embodiments, the method 400 provides additional detail for block 330 of FIG. 3.

The method 400 begins at block 405, where the leader device determines the number of assigned tasks on each participating (or potentially-participating) edge device. In one embodiment, the leader device does so by polling each edge device. In another embodiment, the leader device refers to a separate registry that indicates the tasks or subtasks currently assigned to each device.

In some embodiments, determining the number of tasks for each device may include determining the magnitude or complexity of each such task. For example, the system may determine (or estimate) the computational capability of each edge device (e.g., in terms of operations or tasks per second) as well as the number of operations or tasks that have already been assigned to each device. This can allow the system to ensure that no participating device becomes overloaded.

At block 410, the system identifies the available and/or preferred channels of each edge device. For example, the leader device may request that each edge device indicate its available channels (e.g., channels not currently in use by the edge device. In some embodiments, the edge device(s) can also indicate which channels, of the available channels, are preferred by the device. In one such embodiment, allocating the RUs may include selecting a channel that is available and/or preferred for all of the participating edge devices.

At block 415, the system determines one or more quality indicators of each available channel, with respect to the requesting client device and each edge device. That is, the system can determine, for each respective channel, the quality of the channel for communications between the client device and each edge device (using the respective channel). For example, the system may determine the average signal-to-noise (SNR) ratio of each of the channels or RUs, with respect to each edge device. This information can be used to sort the available channels based on quality, allowing for better RU allocation among the edge devices.

At block 420, the system allocates RUs to the edge devices based on one or more of the above-determined information. For example, based on the tasks assigned to each edge device, the system may select a subset of edge devices that should be used (e.g., excluding edge devices that are fully loaded). Based on the available and preferred channels, as well as the quality indicators for each device, the system can identify a channel that is available to all participating devices, and allocate one or more subcarriers from within this channel to each edge device.

At block 425, the leader device transmits a trigger frame to each selected/participating edge device. In one embodiment, this trigger frame indicates the relevant information to set up the coordinated transmission, such as the identifier of the client device, the assigned RU(s), and the like.

Figure 5:
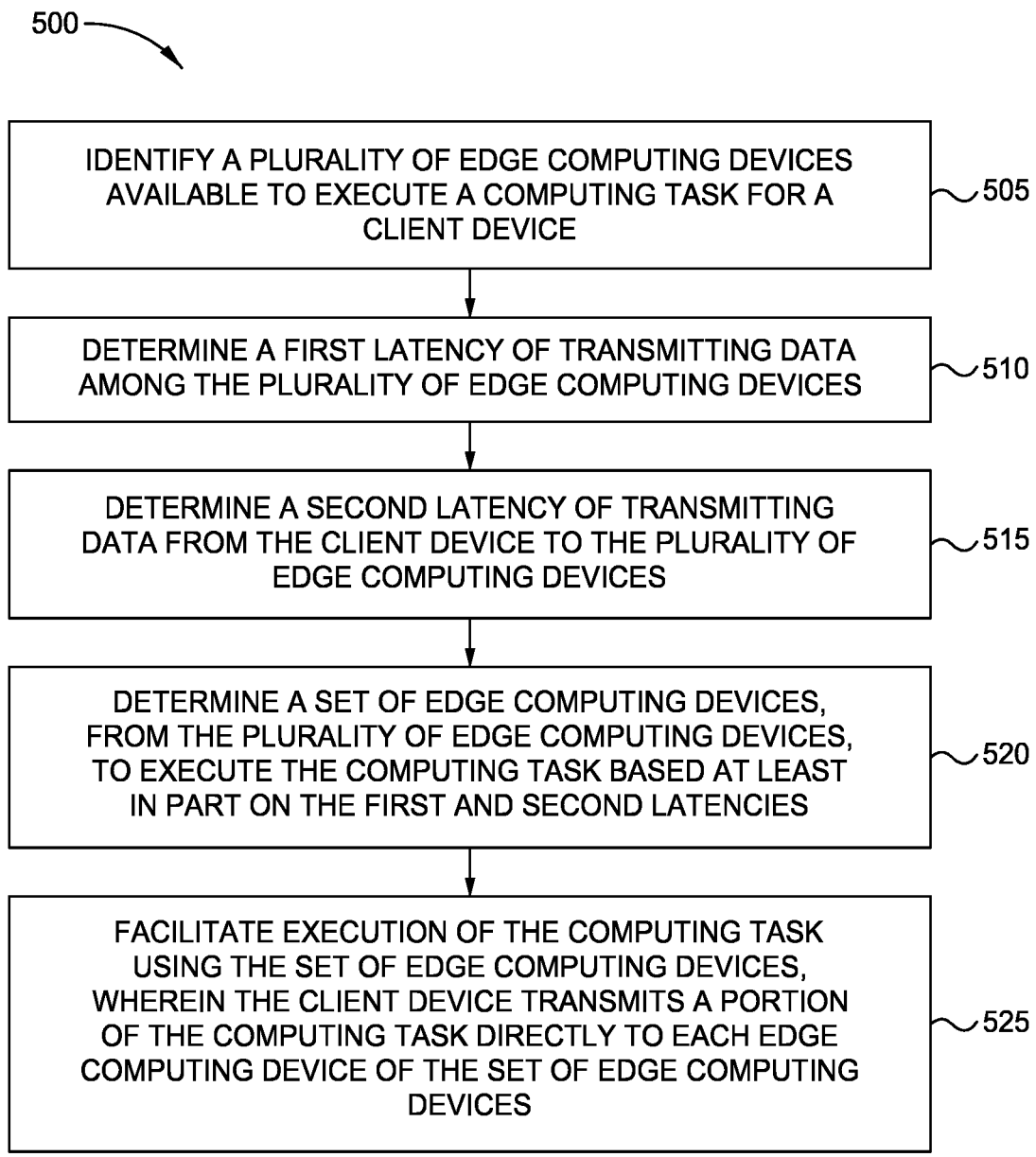
FIG. 5 is a flow diagram depicting a method for distributed edge computation, according to some embodiments disclosed herein.

FIG. 5 is a flow diagram depicting a method 500 for distributed edge computation, according to some embodiments disclosed herein.

At block 505, a computing system (e.g., AP 115A or controller 112 in FIG. 1) identifies a plurality of edge computing devices (e.g., APs 115N in FIG. 1) available to execute a computing task for a client device (e.g., client device 105 in FIG. 1).

In some embodiments, the plurality of edge computing devices are APs in a wireless network.

At block 510, the system determines a first latency of transmitting data among the plurality of edge computing devices.

At block 515, the system determines a second latency of transmitting data from the client device to the plurality of edge computing devices.

At block 520, the system determines a set of edge computing devices, from the plurality of edge computing devices, to execute the computing task based at least in part on the first and second latencies. In one embodiment, this corresponds to block 330 in FIG. 3.

In some embodiments, determining the set of edge computing devices comprises computing a number of edge computing devices, based on the first and second latencies, to use to execute the computing task.

In some embodiments, the number of edge computing devices is computed such that transmitting a portion of the computing task directly to each of the set of edge computing devices is performed with less latency as compared to transmitting the computing task to a single edge computing device for subsequent distribution.

At block 525, the system facilitates execution of the computing task using the set of edge computing devices, wherein the client device transmits a portion of the computing task directly to each edge computing device of the set of edge computing devices.

In some embodiments, transmitting a portion of the computing task directly to each of the set of edge computing devices comprises using C-OFDMA techniques to reduce latency of distributing tasks among the set of edge computing devices.

In some embodiments, transmitting a portion of the computing task directly to each of the set of edge computing devices comprises using MU-MIMO techniques to reduce latency of distributing tasks among the set of edge computing devices.

In some embodiments, the method 500 further includes assigning RUs among the plurality of edge computing devices, wherein transmitting a portion of the computing task directly to each of the set of edge computing devices is performed based at least in part on the assigned RUs.

In some embodiments, assigning the RUs comprises determining a number of assigned tasks for each of the set of edge computing devices and determining available channels for each of the set of edge computing devices.

Figure 6:
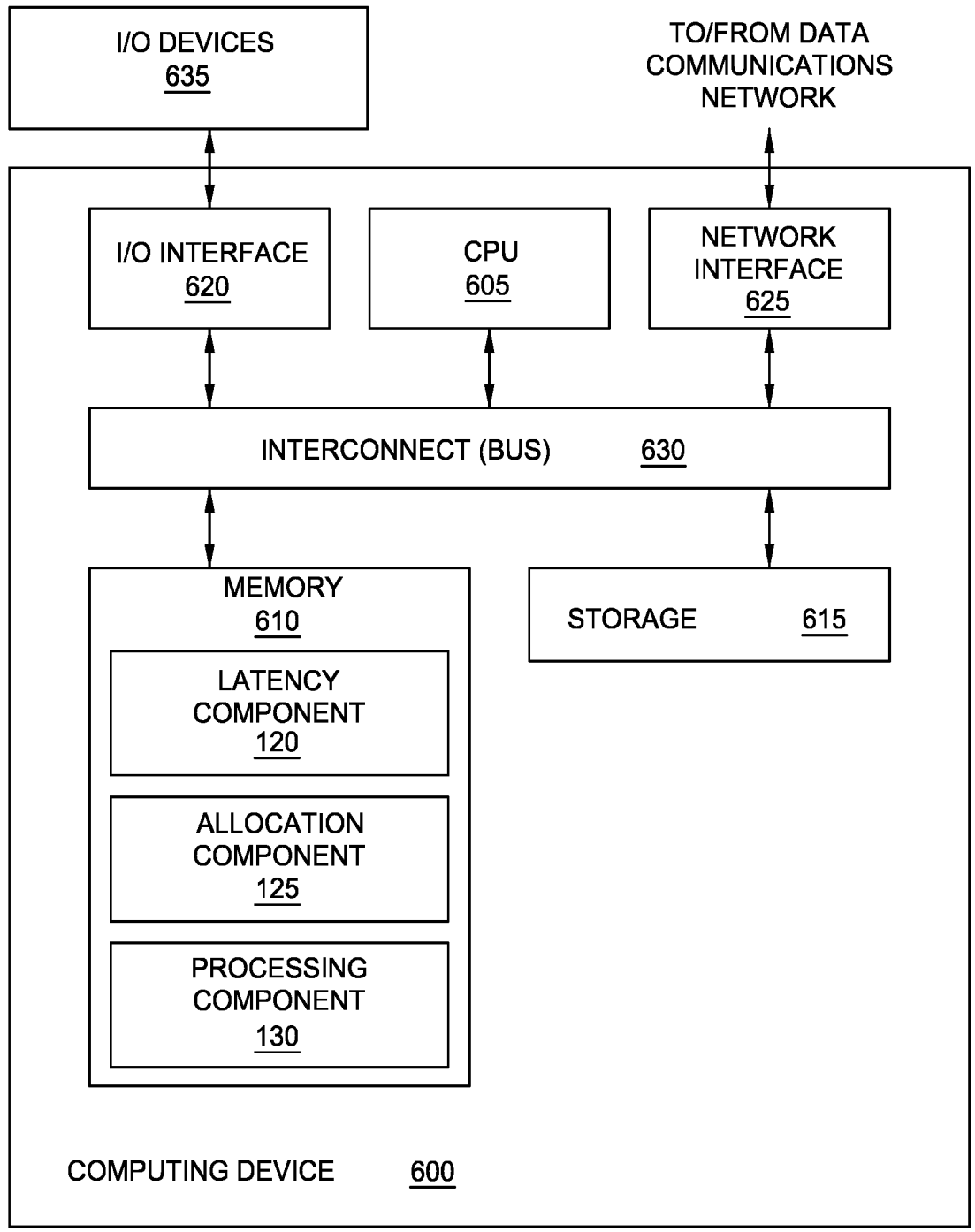
FIG. 6 is a block diagram depicting a computing device to provide coordinated distributed edge computation, according to some embodiments disclosed herein.

FIG. 6 is a block diagram depicting a computing device 600 to provide coordinated distributed edge computation, according to some embodiments disclosed herein.

Although depicted as a physical device, in embodiments, the computing device 600 may be implemented using virtual device(s), and/or across a number of devices (e.g., in a cloud environment). In one embodiment, the computing device 600 corresponds to the AP 115A in FIG. 1. In another embodiment, the computing device 600 corresponds to the controller 112 in FIG. 1. In still another embodiment, the computing device 600 may correspond to a combination of the AP 115A and the controller 112 in FIG. 1

As illustrated, the computing device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes a latency component 120, allocation component 125, and processing component 130, each discussed above with reference to FIG. 1, which may perform one or more embodiments discussed above. Although depicted as discrete components for conceptual clarity, in embodiments, the operations of the depicted components (and others not illustrated) may be combined or distributed across any number of components. Further, although depicted as software residing in memory 610, in embodiments, the operations of the depicted components (and others not illustrated) may be implemented using hardware, software, or a combination of hardware and software.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    identifying a plurality of edge computing devices available to execute a computing task for a client device;
    determining a first latency of transmitting data between a first edge computing device and a second edge computing device, from the plurality of edge computing devices;
    determining a second latency of transmitting data from the client device to one or more of the plurality of edge computing devices;
    determining a set of edge computing devices, from the plurality of edge computing devices, to execute the computing task based at least in part on the first and second latencies; and
    facilitating execution of the computing task using the set of edge computing devices, wherein the client device transmits a portion of the computing task directly to each edge computing device of the set of edge computing devices.

2. The method of claim 1, wherein determining the set of edge computing devices comprises determining how many edge computing devices to use to execute the computing task, based on the first and second latencies.

3. The method of claim 2, wherein how many edge computing devices to use to execute the computing task is determined such that transmitting a portion of the computing task directly to each of the set of edge computing devices is performed with less latency as compared to transmitting the computing task to a single edge computing device for subsequent distribution.

4. The method of claim 1, wherein transmitting a portion of the computing task directly to each of the set of edge computing devices comprises using concurrent orthogonal frequency-division multiple access (C-OFDMA) techniques to reduce latency of distributing tasks among the set of edge computing devices.

5. The method of claim 1, wherein transmitting a portion of the computing task directly to each of the set of edge computing devices comprises using multiple-user multiple input multiple output (MU-MIMO) techniques to reduce latency of distributing tasks among the set of edge computing devices.

6. The method of claim 1, further comprising assigning subcarriers among the plurality of edge computing devices, wherein transmitting a portion of the computing task directly to each of the set of edge computing devices is performed based at least in part on the assigned subcarriers.

7. The method of claim 6, wherein assigning the subcarriers comprises:
    determining a number of assigned tasks for each of the set of edge computing devices; and
    determining available channels for each of the set of edge computing devices.

8. The method of claim 1, wherein the plurality of edge computing devices are access points (APs) in a wireless network.

9. A computer product comprising logic encoded in a non-transitory medium, the logic executable by operation of one or more computer processors to perform an operation comprising:
    identifying a plurality of edge computing devices available to execute a computing task for a client device;
    determining a first latency of transmitting data between a first edge computing device and a second edge computing device, from the plurality of edge computing devices;
    determining a second latency of transmitting data from the client device to one or more of the plurality of edge computing devices;
    determining a set of edge computing devices, from the plurality of edge computing devices, to execute the computing task based at least in part on the first and second latencies; and
    facilitating execution of the computing task using the set of edge computing devices, wherein the client device transmits a portion of the computing task directly to each edge computing device of the set of edge computing devices.

10. The computer product of claim 9, wherein determining the set of edge computing devices comprises determining how many edge computing devices to use to execute the computing task, based on the first and second latencies.

11. The computer product of claim 10, wherein how many edge computing devices to use to execute the computing task is determined such that transmitting a portion of the computing task directly to each of the set of edge computing devices is performed with less latency as compared to transmitting the computing task to a single edge computing device for subsequent distribution.

12. The computer product of claim 9, wherein transmitting a portion of the computing task directly to each of the set of edge computing devices comprises using concurrent orthogonal frequency-division multiple access (C-OFDMA) techniques to reduce latency of distributing tasks among the set of edge computing devices.

13. The computer product of claim 9, the operation further comprising assigning subcarriers among the plurality of edge computing devices, wherein transmitting a portion of the computing task directly to each of the set of edge computing devices is performed based at least in part on the assigned subcarriers.

14. The computer product of claim 13, wherein assigning the subcarriers comprises:
    determining a number of assigned tasks for each of the set of edge computing devices; and determining available channels for each of the set of edge computing devices.

15. A system comprising:

one or more computer processors; and logic encoded in a non-transitory medium, the logic executable by operation of the one or more computer processors to perform an operation comprising:

identifying a plurality of edge computing devices available to execute a computing task for a client device;

determining a first latency of transmitting data between a first edge computing device and a second edge computing device, from the plurality of edge computing devices;

determining a second latency of transmitting data from the client device to one or more of the plurality of edge computing devices;

determining a set of edge computing devices, from the plurality of edge computing devices, to execute the computing task based at least in part on the first and second latencies; and facilitating execution of the computing task using the set of edge computing devices, wherein the client device transmits a portion of the computing task directly to each edge computing device of the set of edge computing devices.

16. The system of claim 15, wherein determining the set of edge computing devices comprises determining how many edge computing devices to use to execute the computing task, based on the first and second latencies.

17. The system of claim 16, wherein how many edge computing devices to use to execute the computing task is determined such that transmitting a portion of the computing task directly to each of the set of edge computing devices is performed with less latency as compared to transmitting the computing task to a single edge computing device for subsequent distribution.

18. The system of claim 15, wherein transmitting a portion of the computing task directly to each of the set of edge computing devices comprises using concurrent orthogonal frequency-division multiple access (C-OFDMA) techniques to reduce latency of distributing tasks among the set of edge computing devices.

19. The system of claim 15, the operation further comprising assigning subcarriers among the plurality of edge computing devices, wherein transmitting a portion of the computing task directly to each of the set of edge computing devices is performed based at least in part on the assigned subcarriers.

20. The system of claim 19, wherein assigning the subcarriers comprises:

determining a number of assigned tasks for each of the set of edge computing devices; and determining available channels for each of the set of edge computing devices.

* * * * *